(12) United States Patent
Gattu et al.

(10) Patent No.: US 10,305,885 B2
(45) Date of Patent: May 28, 2019

(54) ACCESSING ENTERPRISE RESOURCES USING PROVISIONED CERTIFICATES

(71) Applicant: BlackBerry Limited, Waterloo (CA)

(72) Inventors: Balasubrahmanyam Gattu, San Ramon, CA (US); Mendel Elliot Spencer, Ottawa (CA); Robert Lorne Bowerman, Waterloo (CA); Calin Marius Bozsitz, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 208 days.

(21) Appl. No.: 15/060,466

(22) Filed: Mar. 3, 2016

(65) Prior Publication Data

US 2017/0257360 A1    Sep. 7, 2017

(51) Int. Cl.
  *G06F 21/31*   (2013.01)
  *H04L 29/06*   (2006.01)
  *H04W 12/06*   (2009.01)
(52) U.S. Cl.
  CPC .......... *H04L 63/0823* (2013.01); *G06F 21/31* (2013.01); *H04L 63/0807* (2013.01); *H04L 63/0892* (2013.01); *H04L 63/10* (2013.01); *H04W 12/06* (2013.01)
(58) Field of Classification Search
  None
  See application file for complete search history.

(56) References Cited

U.S. PATENT DOCUMENTS

| | | | |
|---|---|---|---|
| 8,307,413 B2 | 11/2012 | Smadja et al. | |
| 8,549,300 B1 | 10/2013 | Kumar et al. | |
| 8,590,027 B2 | 11/2013 | Rowley | |
| 8,850,187 B2 * | 9/2014 | Hoggan | H04L 9/3268 713/156 |
| 8,935,808 B2 | 1/2015 | Barbir | |

(Continued)

FOREIGN PATENT DOCUMENTS

WO    2011047276    6/2011

OTHER PUBLICATIONS

International Search Report and Written Opinion of the International Searching Authority issued in International Application No. PCT/US2017/019596 dated May 26, 2017.

(Continued)

*Primary Examiner* — Jason Chiang
(74) *Attorney, Agent, or Firm* — Fish & Richardson P.C.

(57) ABSTRACT

Systems, methods, and software can be used to access an enterprise resource. In some aspects, a certificate for accessing enterprise resources at one or more service providers (SP) is received at an enterprise mobility management (EMM) client on a mobile device from an EMM server. An authentication request is sent to an identity provider from an application on a mobile device. In response to the authentication request, an authentication challenge is received from the identity provider. The authentication challenge includes a certificate request. In response to the authentication challenge, an authentication response is sent from the application. The authentication response includes the certificate. An authorization token is received from the identity provider. The authorization token indicates whether the identity provider validates the certificate and the mobile device.

18 Claims, 3 Drawing Sheets

(56) References Cited

U.S. PATENT DOCUMENTS

| | | | |
|---|---|---|---|
| 8,955,078 B2 | 2/2015 | Hoggan | |
| 9,032,473 B2 | 5/2015 | Guccione et al. | |
| 9,191,381 B1* | 11/2015 | Popp | G06F 21/34 |
| 9,286,465 B1* | 3/2016 | Jain | G06F 21/41 |
| 2003/0048906 A1* | 3/2003 | Vora | G06Q 20/00 |
| | | | 380/277 |
| 2010/0064134 A1* | 3/2010 | Gross | G06F 21/41 |
| | | | 713/155 |
| 2010/0281530 A1 | 11/2010 | Tarkoma | |
| 2012/0214444 A1* | 8/2012 | McBride | H04L 63/0807 |
| | | | 455/411 |
| 2013/0346745 A1 | 12/2013 | Broch | |
| 2014/0068722 A1* | 3/2014 | Hayat | G06Q 20/02 |
| | | | 726/4 |
| 2014/0068743 A1 | 3/2014 | Marcus et al. | |
| 2014/0379584 A1* | 12/2014 | Ward | G06Q 20/3829 |
| | | | 705/71 |
| 2015/0040190 A1 | 2/2015 | Oberheide et al. | |
| 2016/0162669 A1* | 6/2016 | Mikhailov | G06F 21/10 |
| | | | 713/2 |
| 2016/0285858 A1* | 9/2016 | Li | H04L 63/0815 |
| 2017/0078272 A1* | 3/2017 | Guionneau | G06F 21/41 |
| 2017/0126661 A1* | 5/2017 | Brannon | H04L 63/0815 |

OTHER PUBLICATIONS

Oasis; SAML V2.0 Holder-of-Key Web Browser SSO Profile Version 1.0; Committee Specification 02; Aug. 10, 2010; 24 pages.
European Office Action issued in European Application No. 17709890.2 dated Sep. 7, 2018, 3 pages.

\* cited by examiner

ACCESSING ENTERPRISE RESOURCES USING PROVISIONED CERTIFICATES

BACKGROUND

The present disclosure relates to accessing enterprise resources. In some cases, in attempts to obtain services from a service provider over a network, an application on a mobile device may send a request to the service provider to access a resource. The service provider may grant the access if the application is authorized to access the resource.

DESCRIPTION OF DRAWINGS

Like reference numbers and designations in the various drawings indicate like elements.

DETAILED DESCRIPTION

In some cases, access to resources of a service provider may be restricted. For example, restrictions to resources may be implemented by a sign-on process. During the sign-on process, a user may be prompted with an authentication request for a username and a password. If the username and password are validated, then the user may be granted access to the resources.

In some cases, a user may perform the sign-on process for every application that requests restricted resources. Managing multiple usernames and passwords may adversely impact the user experience. In some cases, a single sign-on (SSO) process may be used. During a SSO process, a user may use one set of username and password for multiple applications that request restricted resources associated with a common entity. For example, the user may use one set of username and password to access resources in one enterprise from multiple enterprise applications associated with the enterprise. In a SSO process, a user may be prompted to enter the same username and password every time one of the enterprise application attempts to access the enterprise resources. In some cases, the username or password may be stored in a file system of the device, e.g., a cache or a cookie, and therefore can be retrieved without additional user input. However, the file system may not be part of a secure environment and therefore is susceptible to attacks from malicious applications.

In some cases, a zero sign-on (ZSO) process can be used to further improve the user experience. In a ZSO process, a user may be authenticated without entering username or password. In some cases, during a ZSO process, when an application on a mobile device requests an enterprise resource from a service provider (SP), the SP may redirect the request to an identity provider (IDP). The IDP may request a certificate from the application and send the certificate to the SP for validations. In some cases, the certificate may be sent using a holder-of-key subject confirmation field in a Security Assertion Markup Language (SAML) assertion. The SP may validate the certificate and grant access to the application accordingly. In these cases, the SP may be customized to verify the certificate sent from the IDP. For example, an IDP may provide a software development kit (SDK) to the SP, and the SP can use the SDK to implement the certificate verification procedures. Alternatively or additionally, application wrapping may be used to verify the certificate. In these cases, the IDP may use application wrapping to send an extension for certificate verification to the SP so that SP can execute certificate verification using the extension. However, using these approaches may increase the implementation complexity of the SP. In some cases, an SP may provide services for different enterprises, each using a different IDP. In these or other cases, the SP may implement different customizations for the certificate verifications of these different IDPs.

In some cases, a certificate for accessing resources for a particular enterprise may be provisioned during device enrollment with an enterprise mobility management (EMM) server that manages the mobile devices for the particular enterprise. The certificate can be signed by an IDP associated with the particular enterprise and the signed certificate can be sent to the mobile device by the EMM server. The certificate can be stored in a secure environment on the mobile device and accessed by applications on the mobile device that are authorized to access the resources associated with the particular enterprise. An application requesting the enterprise resources can send the certificate to the IDP in a handshake protocol between the application and the IDP. The IDP can validate the certificate and the mobile device. FIGS. 1-4 and associated descriptions provide additional details of these implementations.

This approach can provide one or more advantages. For example, the SP may avoid customizations for certificate verifications for different IDPs, and therefore implementation complexity can be reduced. In addition, the device or the user can be validated in addition to the application requesting the resource, and therefore the level of security protection can be increased. Furthermore, the certificate can be managed in a secure environment that provides additional protections.

Figure 1:
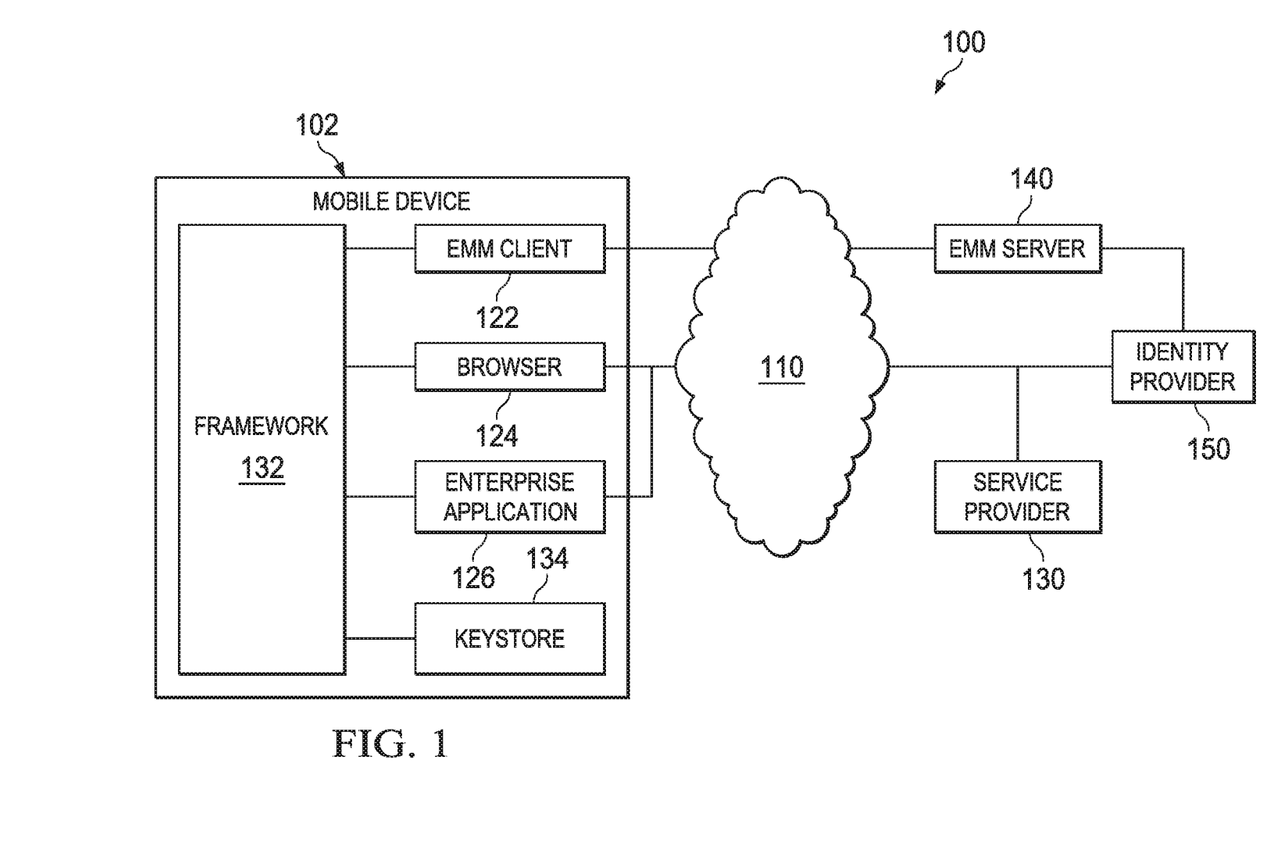
FIG. 1 is a schematic diagram showing an example communication system that access enterprise resources.

FIG. 1 is a schematic diagram showing an example communication system 100 that provides access for enterprise resources. The example communication system 100 includes a mobile device 102 that is communicatively coupled with a service provider (SP) 130, an enterprise mobility management (EMM) server 140, and an identity provider (IDP) 150 through a wireless communication network 110.

Figure 2:
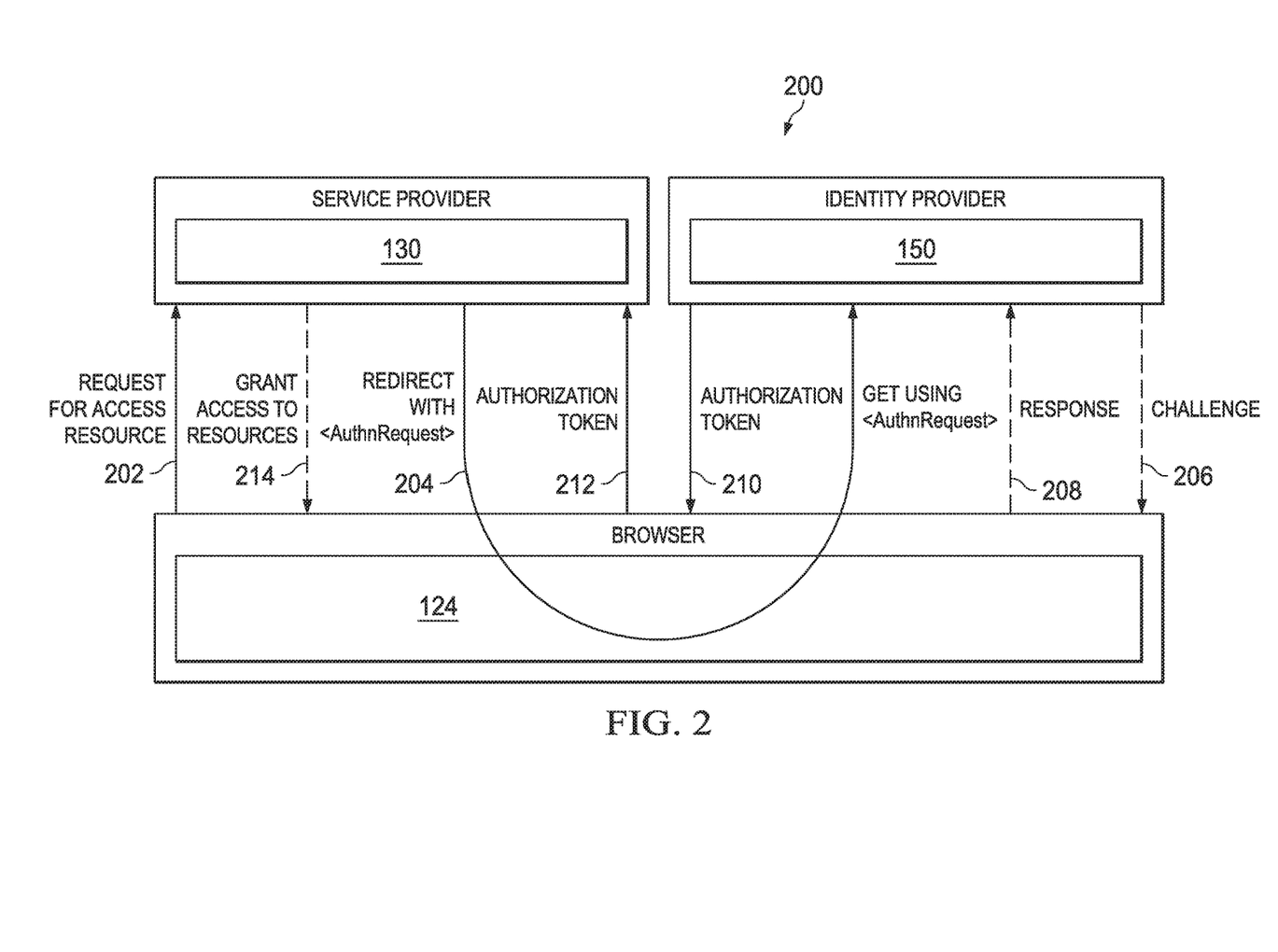
FIG. 2 is a flow diagram showing an example process for accessing enterprise resources.
Figure 3:
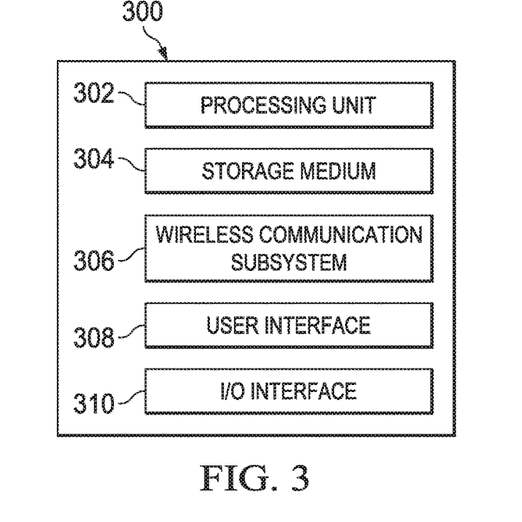
FIG. 3 is a block diagram illustrating an example mobile device.
Figure 4:
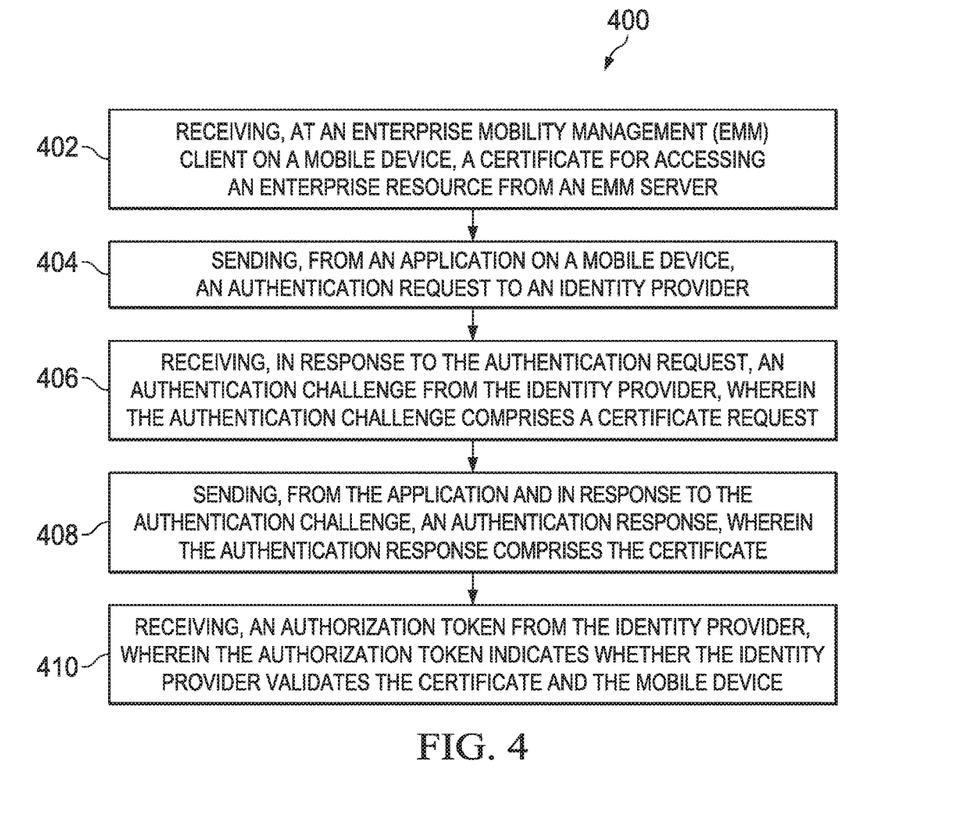
FIG. 4 is a flowchart showing an example method for accessing enterprise resources.

The SP 130 represents an application, set of applications, software, software modules, hardware, or combination thereof that can be configured to provide enterprise resources. The enterprise resources can include file systems, websites, portals, or any other resources that are provisioned to provide enterprise services. In some cases, access to enterprise resources can be granted to applications that are validated. FIGS. 2-4 and associated descriptions provide additional details of these implementations.

The IDP 150 represents an application, set of applications, software, software modules, hardware, or combination thereof that can be configured to identify an entity. In some cases, the IDP 150 can also be referred to as an Identity Assertion Provider. The IDP 150 can validate an application that requests to access the enterprise resource and asserts to SP 130 that the application is authenticated. In some cases, the IDP 150 can also validate a user or a mobile device associated with the requests. FIGS. 2-4 and associated descriptions provide additional details of these implementations.

The EMM server 140 represents an application, set of applications, software, software modules, hardware, or combination thereof that can be configured to manage applications and devices for an enterprise. For example, the EMM server 140 can install, update, and manage the license of enterprise applications. In some cases, the EMM server 140 can include an application store for the enterprise applications. In some cases, the EMM server 140 can include a database for the authorization status of users and mobile devices that can access the enterprise resources.

The example communication system 100 includes the mobile device 102. As shown in FIG. 1, the mobile device includes an EMM client 122, a browser 124, an enterprise application 126, a framework 132, and a keystore 134.

The EMM client 122 represents an application, set of applications, software, software modules, hardware, or combination thereof that can be configured to manage enterprise services on the mobile device 102. In some cases, the EMM client 122 can configure the enterprise application 126 using application program interfaces (APIs).

In some cases, the EMM client 122 can communicate with the EMM server 140 to manage access to enterprise resources on the mobile device 102. In some cases, a certificate can be used for the authentication of an application that requests access to the enterprise resource. In some cases, the certificate can be obtained during the enrollment of the mobile device 102.

In one example, during the enrollment, the EMM client 122 can generate a private-public key pair. The EMM client 122 can send a certificate signing request to the EMM server 140. The certificate signing request includes the generated public key. The EMM server 140 can forward the certificate signing request to the IDP 150. In some cases, the EMM server 140 can also send additional information, e.g., the information associated with the mobile device 102, a user identifier for a user of the mobile device 102, an enterprise identifier associated with an enterprise managed by the EMM server 140, an entitlement to access the enterprise resource for the mobile device 102 of the user of the mobile device 102, or a combination thereof, with the certificate signing request to the IDP 150. The IDP 150 can prepare a certificate for the mobile device 102 using the public key received in the certificate signing request, sign the certificate, e.g., using a private key of the IDP 150, and send the signed certificate to the EMM server 140. The EMM server 140 can forward the certificate to the EMM client 122.

The framework 132 represents an application, set of applications, software, software modules, hardware, or combination thereof that can be configured to manage the operating environment on the mobile device 102. In some cases, the framework 132 can include an operating system of the mobile device 102. In some cases, the framework 132 manages the access to the keystore. In these or other cases, the EMM client 122, the browser 124, the enterprise application 126 can access the certificate in the keystore 134 through the framework 132.

The keystore 134 represents an application, set of applications, software, software modules, hardware, or combination thereof that can be configured to store the certificate for accessing the enterprise resources. In some cases, the EMM client 122 can deposit the signed certificate received from the EMM server 140 into the keystore 134. In some cases, the keystore 134 can be part of a trustzone (TZ). A TZ is a secure execution that is configured to isolate an operating environment from the generating operating system of the mobile device. The TZ can include a set of security extensions that can be used to execute security operations. The security operations can be executed in the TZ with an increased level of security. Examples of the security operations executed in the TZ can include generating a certificate, requesting a certificate, updating a certificate, and etc. In some cases, the TZ is implemented using hardware processors to provide additional security.

The browser 124 represents an application, set of applications, software, software modules, hardware, or combination thereof that can be configured to access a website. In some cases, the browser 124 is compliant with the Security Assertion Markup Language (SAML) 2.0 standard. In some cases, the browser 124 can access an enterprise website for enterprise resources.

The enterprise application 126 represents an application, set of applications, software, software modules, or combination thereof that can perform enterprise services and access enterprise resources at a SP. Examples of the enterprise application 126 include email application for an enterprise account, enterprise document sharing applications, enterprise development tools, and third party Software as a Service (SaaS) SaaS application.

In some cases, the certificate described previously can be provisioned only for applications that are authorized to access enterprise resources, e.g., the browser 124 and the enterprise application 126. Therefore, if an application, other than the browser 124 and the enterprise application 126, requests the certificate, the request may be denied. In some cases, the EMM client 122 can use a whitelist to provision the authorized resources. The whitelist can include the list of applications that are authorized to request the certificate. In some cases, the EMM client 122 can use a black list to provision the authorized resources. The black list can include the list of applications that are not authorized to request the certificate. In some cases, the whitelist or the black list can be managed by the framework 132. The framework 132 can check the whitelist or the black list before granting a request for the certificate. In some cases, containers, e.g., KNOX workspace container or ANDROID for WORK Managed Profile container can be used to provision the authorized applications.

In some cases, the applications that are provisioned for the certificate can be determined by the IDP 150, the EMM server 140, the SP 130, or a combination thereof. The EMM client 122 can receive provisioning instructions from the EMM server 140 and set the provisions accordingly.

In some cases, an application, e.g., the browser 124 or the enterprise application 126 requests an access to an enterprise resource from the SP 130. The application can send an authentication request to the IDP 150. The IDP 150 can send an authentication challenge to the application. The application can send an authentication response that includes the certificate for accessing the enterprise resource. The IDP 150 can authenticate the certificate and send an authorization token to the application. The application can forward the authorization token to the SP 130 to access the enterprise resource. FIGS. 2-4 and associated descriptions provide additional details of these implementations.

As shown in FIG. 1, the example communication system includes the wireless communication network 110. The wireless communication network 110 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for the mobile device 102 to communicate. The base station may be distributed throughout the cellular network to provide a wide area of coverage. The base station directly communicates to one or a plurality of mobile devices, other base stations, and one or more core network nodes. The base station may operate on any of the different wireless communication technologies. Example wireless technologies include Global System for Mobile Communication (GSM), Universal Mobile Telecommunications System (UMTS), 3GPP Long Term Evolution (LTE), LTE-Advanced (LTE-A), wireless broadband communication technologies, and others. Example wireless broadband communication systems include IEEE 802.11 wireless local area network, IEEE 802.16 WiMAX network, and others.

Turning to a general description, a mobile device, e.g., the mobile device 102, may be referred to as mobile electronic device, user device, mobile station, subscriber station, portable electronic device, mobile communications device, wireless modem, or wireless terminal. Examples of a mobile device (e.g., the mobile device 102) may include a cellular phone, personal data assistant (PDA), smart phone, laptop, tablet personal computer (PC), pager, portable computer, portable gaming device, wearable electronic device, or other mobile communications device having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

FIG. 2 is a flow diagram showing an example process 200 for accessing enterprise resources. The process 200 can be implemented by any type of system or module that accesses enterprise resources. For example, the process 200 can be implemented by the mobile device 102, the SP 130, the IDP 150, or a combination thereof, shown in FIG. 1. The example process 200, shown in FIG. 2, can also be implemented using additional, fewer, or different operations, which can be performed in the order shown or in a different order.

The example process 200 begins at 202, where an access request for an enterprise resource is sent. For example, the access request can be a request for an enterprise service. In some cases, as shown in FIG. 2, the access request can be sent by the browser 124 on a mobile device. Alternatively or in combination, the access request can be sent by the enterprise application 126 on the mobile device. In some cases, as discussed previously, the entity that sends the access request, e.g., the browser 124 or the enterprise application 126, has been provisioned with authorizations to access the enterprise resource. In some cases, as shown in FIG. 2, the access request is sent to the SP 130 that provides enterprise services and manages enterprise resources. For example, the access request can be a Simple Object Access Protocol (SOAP) message or a Hypertext Transfer Protocol (HTTP) Representational State Transfer (REST) message.

At 204, in response to the access request, an authentication request is sent from the SP 130 to the browser 124. The browser 124 forwards the authentication request to the IDP 150. In some cases, a web page associated with the IDP 150 can be rendered in the browser 124 in response to the forwarded authentication request.

In some cases, the browser 124 can initiate authentication without prior access to the SP 130. For example, the browser 124 can skip the step 202, and generate the authentication request instead of receiving the authentication request from the SP 130 as a response to the access request. The browser 124 can send the generated authentication request to the IDP 150. For example, the authentication request can be a HTTP message or a HTTP secure (HTTPS) message.

At 206, the IDP 150 sends an authentication challenge to the browser 124. In some cases, the authentication challenge includes a request for a certificate. In some cases, the authentication challenge can be sent using the Transport Layer Security (TLS) handshake protocol.

At 208, the browser 124 sends an authentication response to the IDP 150 in response to the authentication challenge. In some cases, the authentication response can be sent using the Transport Layer Security (TLS) handshake protocol.

In some cases, the authentication response includes a certificate. For example, the authentication response can include the certificate received by the EMM client 122, e.g., as discussed previously in FIG. 1 and associated descriptions. In some cases, the browser 124 can access a keystore, e.g., the keystore 134 in FIG. 1, on the mobile device 102 to retrieve the certificate. In some cases, the certificate is provisioned only for applications that are authorized to access the enterprise resources. In these or other cases, the keystore, the operating system of the mobile device, or a combination thereof can determine whether the browser 124 is authorized to use the certificate. If the browser 124 is authorized, then the browser can retrieve the certificate. If the browser 124 is not authorized, then the retriever may be blocked and the browser 124 cannot use the certificate to generate the authentication response.

In some cases, the authentication response may not include user entered authentication credentials such as username and password. In these or other cases, the authentication response can be generated and sent to the IDP 150 without user interaction. This approach expedites the authentication process.

In some cases, the IDP 150 can send a second authentication request to the browser 124. The second authentication request can include a request for authentication credentials. In these or other cases, a user interface can be outputted on the mobile device. The user can provide credentials, e.g., username and password or some other second factor credentials. The browser 124 can send a second authentication response. The second authentication response can include the authentication credentials. This approach can provide additional security during the authentication procedure. In some cases, an EMM server can provision the IDP 150 whether to request authentication credentials.

In some cases, the authentication can include validation of the certificate that is included in the authentication response. The authentication procedure can be performed by the IDP 150, an EMM server, a combination thereof, or any other entities that can be used to perform the authentication calculations. In one example, the certificate may be signed with the private key of the IDP 150. Therefore, the IDP 150 can validate whether or not the certificate is authentic by validating the signature of the certificate.

In some cases, in addition to validating the certificate, the IDP 150 can further determine whether the user or the mobile device is authorized to access the enterprise resource. For example, as discussed previously, information associated with the certificate, e.g., user information, mobile device information, or a combination thereof may be sent to the IDP 150 during the generation of the certificate. Therefore, the IDP 150 can check whether the user or the mobile device are authorized to access the enterprise resources. In some cases, a user or a mobile device may lose authorization. In one example, a user may be an ex-employee that loses the authorization. In another example, a mobile device may no longer be authorized because it fails to comply with security policies set by the enterprise. In these or other cases, the IDP 150 can determine that the user or the mobile device is not validated.

In some cases, the EMM server keeps track of the status of the user and the mobile devices. For example, an EMM client can monitor the mobile device and report any security issues, e.g., malware, to the EMM server. In some cases, the EMM server can update the IDP 150 if any security issues arise and the user or the mobile device is no longer authorized. Alternatively or in combination, the IDP 150 can query the EMM server for the status of the user or the mobile device and validate the user or the mobile device accordingly.

In some cases, as discussed previously, the authentication response can include user credentials. In these or other cases, the user credentials can be verified to determine whether the user is authorized. The verification can be performed by the IDP 150, the EMM server, or a combination thereof.

At 210, the IDP 150 sends an authorization token to the browser 124. In some cases, the authorization token is sent in response to the authentication of the browser 124. In some cases, the authorization token can include a username, an authentication status, or a combination thereof. The authentication status can indicate whether the authentication succeeds or fails. For example, if any of the validation procedures discussed above, e.g., the certificate verification, the user or mobile device verification, or the user credentials verification, is not successful, the authentication status may be set to fail. If all the validation procedures succeed, the authentication status may be set to success.

In some cases, the authorization token can be signed with a private key of the IDP 150. In some cases, the authorization token can be formatted as a Security Assertion Markup Language (SAML) assertion or an OpenID Connect ID Token. The SAML assertion may not include key information for authentication. For example, the SAML assertion may not include a holder-of-key subject confirmation field when the SP does not support it.

At 212, the browser 124 sends the authorization token to the SP 130. In some cases, the browser 124 can use a post command to send the authorization token. The SP 130 can determine whether the browser 124 is authorized to access the enterprise resource based on the authentication status in the authorization token. In some cases, as discussed previously, the authorization token may be signed with a private key of the IDP 150. In these or other cases, the SP 130 can use the public key of the IDP 150 to validate the signature on the authorization token.

At 214, if the authentication status indicates that the authentication is successful, as shown in FIG. 2, the SP 130 can provide the access to the browser 124 for accessing the enterprise resource. If the authentication status indicates that the authentication fails, the SP 130 can decline access to the browser 124.

FIG. 3 is a block diagram illustrating an example mobile device 300. The illustrated device 300 includes a processing unit 302, a computer-readable storage medium 304 (for example, ROM or flash memory), a wireless communication subsystem 306, a user interface 308, and an I/O interface 310.

The processing unit 302 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 302 may be configured to generate control information, such as a measurement report, or respond to received information, such as control information from a network node. The processing unit 302 may also be configured to make a Radio Resource Management (RRM) decision such as cell selection/reselection information or trigger a measurement report. The processing unit 302 can also include other auxiliary components, such as random access memory (RAM) and read-only memory (ROM). The computer-readable storage medium 304 can store an operating system (OS) of the device 300 and various other computer-executable instructions, logic or software programs for performing one or more of the processes, steps, or actions described above. In some cases, the computer-readable storage medium 304 can be transitory, non-transitory, or a combination thereof.

The wireless communication subsystem 306 may be configured to provide wireless communication for voice, data, and/or control information provided by the processing unit 302. The wireless communication subsystem 306 can include, for example, one or more antennas, a receiver, a transmitter, a local oscillator, a mixer, and a digital signal processing (DSP) unit. In some implementations, the subsystem 306 can support multiple-input multiple-output (MIMO) transmissions. In some implementations, the receiver in the wireless communication subsystems 306 can be an advanced receiver or a baseline receiver. Two receivers can be implemented with identical, similar, or different receiver processing algorithms.

The user interface 308 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 310 can include, for example, a universal serial bus (USB) interface.

FIG. 4 is a flowchart showing an example method 400 for accessing enterprise resources. The method 400 can be implemented by any type of system or module that accesses the enterprise resources. For example, the method 400 can be implemented by the mobile device 102 shown in FIG. 1. The example method 400, shown in FIG. 4, can also be implemented using additional, fewer, or different operations, which can be performed in the order shown or in a different order.

The method 400 begins at 402, where a certificate for accessing an enterprise resource is received at an enterprise mobility management (EMM) client on a mobile device from an EMM server. In some cases, the EMM client can generate a key pair for accessing the enterprise resource and get the signed certificate from the EMM server by sending a Certificate Signing Request (CSR) including the generated public key to the EMM server. At 404, an authentication request is sent to an identity provider from an application on a mobile device. In some cases, the authentication response is sent in response to determining that the application is provisioned to use the certificate for the enterprise associated with the enterprise resource. In some cases, the application sends a request to a service provider that provides enterprise services for the enterprise. In these cases, the authentication request is received from the service provider in response to the access request. Alternatively or additionally, the authentication request is initiated in response to accessing the identity provider by the application. At 406, in response to the authentication request, an authentication challenge is received from the identity provider. The authentication challenge includes a certificate request. At 408, in response to the authentication challenge, an authentication response is sent from the application. The authentication response includes the certificate. In some cases, in response to the authentication response, a second authentication request is received for authentication credentials. In response to the second authentication request; a second authentication response is sent. The second authentication response comprises authentication credentials associated with the application. At 410, an authorization token is received from the identity provider. The authorization token indicates whether the identity provider validates the certificate and the mobile device.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, the data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data-processing apparatus" encompasses all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory, a random-access memory, or both. A computer can include a processor that performs actions in accordance with instructions and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including, by way of example, semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions, substitutions, and changes in the form and details of the system illustrated may be made by those skilled in the art, without departing from the intent of the disclosure. In addition, the order of method steps is not implied by the order in which they appear in the claims.

What is claimed is:

1. A method, comprising:
   receiving, at an enterprise mobility management (EMM) client on a mobile device and from an EMM server, a certificate for accessing an enterprise resource, wherein the certificate is generated by an identity provider and provided to the EMM server, and the certificate is generated based on a public key generated by the EMM client and a private key of the identity provider;
   sending, from an application on the mobile device, an authentication request to the identity provider;
   receiving, in response to the authentication request, an authentication challenge from the identity provider, wherein the authentication challenge comprises a certificate request;
   in response to the authentication challenge, sending, from the application to the identity provider, an authentication response, wherein the authentication response comprises the certificate, and the certificate is retrieved from a keystore that is part of a trustzone (TZ) on the mobile device; and
   receiving, an authorization token from the identity provider, wherein the authorization token indicates that the certificate is validated by the identity provider and that the mobile device is validated by the identity provider as an authorized mobile device based on a query between the identity provider and the EMM server from which the mobile device received the certificate.

2. The method of claim 1, further comprising:
   prior to sending the authentication response, determining whether the application is provisioned to use the certificate for an enterprise associated with the enterprise resource; and
   wherein sending the authentication response is in response to determining that the application is provisioned.

3. The method of claim 1, further comprising:
   sending, from the application on the mobile device, an access request to a service provider that provides enterprise services for an enterprise; and
   receiving, in response to the access request, the authentication request.

4. The method of claim 1, wherein the authentication request is initiated in response to accessing the identity provider by the application.

5. The method of claim 1, wherein the authentication challenge and the authentication response are transmitted according to a Transport Layer Security (TLS) Handshake Protocol.

6. The method of claim 1, further comprising:
   receiving, in response to the authentication response, a second authentication request for authentication credentials; and
   sending, in response to the second authentication request, a second authentication response, wherein the second authentication response comprises authentication credentials associated with the application.

7. The method of claim 1, wherein the application comprises at least one of an enterprise application or a browser.

8. A mobile device, comprising:
   a memory; and
   at least one hardware processor communicatively coupled with the memory and configured to:
   receive, at an enterprise mobility management (EMM) client on the mobile device and from an EMM server, a certificate for accessing an enterprise resource, wherein the certificate is generated by an identity provider and provided to the EMM server, and the certificate is generated based on a public key generated by the EMM client and a private key of the identity provider;
   send, from an application on the mobile device, an authentication request to the an identity provider;
   receive, in response to the authentication request, an authentication challenge from the identity provider, wherein the authentication challenge comprises a certificate request;
   in response to the authentication challenge, send, from the application to the identity provider, an authentication response, wherein the authentication response comprises the certificate, and the certificate is retrieved from a keystore that is part of a trustzone (TZ) on the mobile device; and
   receive, an authorization token from the identity provider, wherein the authorization token indicates that the certificate is validated by the identity provider and that the mobile device is validated by the identity provider as an authorized mobile device based on a query between the identity provider and the EMM server from which the mobile device received the certificate.

9. The mobile device of claim 8, wherein the at least one hardware processor is further configured to:

prior to sending the authentication response, determine whether the application is provisioned to use the certificate for an enterprise associated with the enterprise resource; and wherein sending the authentication response is in response to determining that the application is provisioned.

10. The mobile device of claim 8, wherein the at least one hardware processor is further configured to:

send, from the application on the mobile device, an access request to a service provider that provides enterprise services for an enterprise; and receive, in response to the access request, the authentication request.

11. The mobile device of claim 8, wherein the authentication request is initiated in response to accessing the identity provider by the application.

12. The mobile device of claim 8, wherein the authentication challenge and the authentication response are transmitted according to a Transport Layer Security (TLS) Handshake Protocol.

13. The mobile device of claim 8, wherein the at least one hardware processor is further configured to:

receive, in response to the authentication response, a second authentication request for authentication credentials; and send, in response to the second authentication request, a second authentication response, wherein the second authentication response comprises authentication credentials associated with the application.

14. The mobile device of claim 8, wherein the application comprises at least one of an enterprise application or a browser.

15. A non-transitory computer-readable medium containing instructions which, when executed, cause a computing device to perform operations comprising:

receiving, at an enterprise mobility management (EMM) client on a mobile device and from an EMM server, a certificate for accessing an enterprise resource, wherein the certificate is generated by an identity provider and provided to the EMM server, and the certificate is generated based on a public key generated by the EMM client and a private key of the identity provider;

sending, from an application on the mobile device, an authentication request to the identity provider;

receiving, in response to the authentication request, an authentication challenge from the identity provider, wherein the authentication challenge comprises a certificate request;

in response to the authentication challenge, sending, from the application to the identity provider, an authentication response, wherein the authentication response comprises the certificate, and the certificate is retrieved from a keystore that is part of a trustzone (TZ) on the mobile device; and receiving, an authorization token from the identity provider, wherein the authorization token indicates that the certificate is validated by the identity provider and that the mobile device is validated by the identity provider as an authorized mobile device based on a query between the identity provider and the EMM server from which the mobile device received the certificate.

16. The non-transitory computer-readable medium of claim 15, wherein the operations further comprise:

prior to sending the authentication response, determining whether the application is provisioned to use the certificate for an enterprise associated with the enterprise resource; and wherein sending the authentication response is in response to determining that the application is provisioned.

17. The non-transitory computer-readable medium of claim 15, wherein the operations further comprise:

sending, from the application on the mobile device, an access request to a service provider that provides enterprise services for an enterprise; and receiving, in response to the access request, the authentication request.

18. The non-transitory computer-readable medium of claim 15, wherein the authentication request is initiated in response to accessing the identity provider by the application.

* * * * *